June 7, 1960   R. N. NELSEN   2,939,808
METHOD OF FORMING AN ADHERENT FILM OF MAGNESIUM OXIDE
Filed Oct. 31, 1958
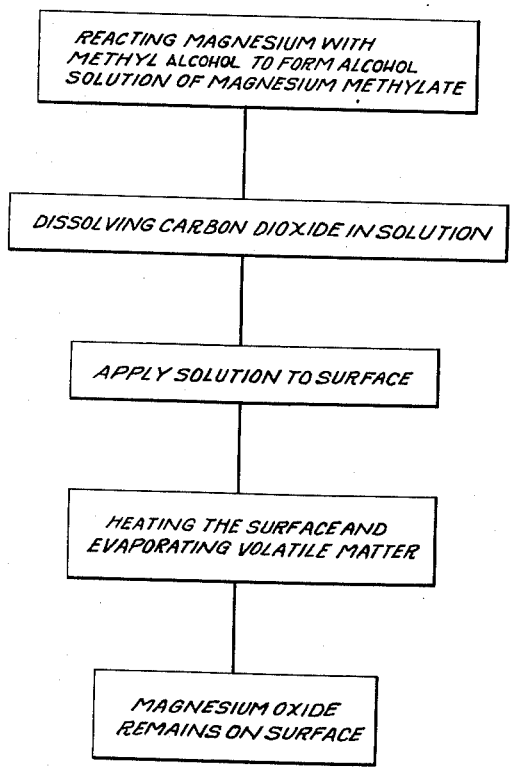
Inventor:
Ronald N. Nelsen,
by Andrew J. Bootz
Attorney.

United States Patent Office 2,939,808
Patented June 7, 1960

2,939,808

METHOD OF FORMING AN ADHERENT FILM OF MAGNESIUM OXIDE

Ronald N. Nelsen, Fort Wayne, Ind., assignor to General Electric Company, a New York corporation Filed Oct. 31, 1958, Ser. No. 770,918

11 Claims. (Cl. 117—222)

This invention relates to coating methods, and more particularly to a method for providing a very thin, adherent coating of magnesium oxide.

United States Patent Number 2,796,364, issued June 18, 1957, to L. A. Suchoff and assigned to the United States of America, describes a method of forming an adherent film of magnesium oxide upon a surface wherein an alcohol solution of magnesium alkoxide from the group of magnesium methylate, magnesium ethylate, and magnesium propylate is applied to a surface; the surface then being heated to evaporate volatile matter thereby providing an adherent film of magnesium oxide on the surface.

In applying such a coating according to the teaching of the above mentioned Suchoff patent, difficulty has been experienced in that a precipitate forms in the coating solution, particularly where the concentration of magnesium in the coating solution is high, for example, in excess of 1% of magnesium by weight. Such precipitate is believed to be magnesium hydroxide, $Mg(OH)_2$. The magnesium hydroxide is formed when the coating solution comes in contact with moisture in the air. Of course, the precipitate may be filtered out so that there results a supernatant liquid which is a solution of magnesium alkoxide in alcohol; however, difficulty is then experienced in proper control of the concentration of the magnesium in the coating solution, and additional precipitate readily forms upon exposure of the solution to moisture in the air.

It is desirable that the coating solution have a sufficient concentration of magnesium to produce a magnesium oxide coating thick enough for such purposes as, for example, dielectric strength on magnetic laminations of cores of electric inductive devices. For this purpose, a coating solution containing 2 to 5% of magnesium may be useful. Further, lower concentrations of magnesium in the solution increases the cost of the alcohol needed for the solution in relation to the quantity of dissolved magnesium therein.

It is an object of the present invention to provide an improved method for forming a thin coating of magnesium oxide on a surface.

It is a further object to provide an improved method for applying a thin coating of magnesium oxide to a surface wherein the tendency of the magnesium to form a precipitate in the coating solution is virtually eliminated.

A further object is to provide a method for preventing the formation of precipitate in alcohol coating solutions of magnesium alkoxide.

According to the invention, an adherent film of magnesium oxide may be provided on a surface by first reacting magnesium with a dry alcohol selected from the group consisting of methyl alcohol, ethyl alcohol and propyl alcohol to thereby form the alcohol solution of the corresponding magnesium alkoxide, and then combining with the alcoholic solution a compound which reacts with magnesium hydroxide precipitate to form a soluble magnesium compound in the alcoholic solution. The coating solution so formed is then applied to the surface and the surface is heated to thereby evaporate all the volatile matter. In this manner, there is provided an adherent film of magnesium oxide remaining upon the surface.

The invention together with additional objects and advantages thereof will be best understood from the following description of specific embodiments, when read in connection with the accompanying drawing, in which the single figure is a flow diagram illustrating a preferred embodiment of the instant invention.

In one preferred embodiment of the instant invention, the magnesium is reacted with methyl alcohol to form magnesium methylate. Water present either in the air or in the solution will react with the magnesium to form a precipitate of magnesium hydroxide. According to the invention, such a precipitate of magnesium hydroxide is then combined with an acid which will react with the magnesium to form a methyl alcohol soluble magnesium compound. An organic acid, such as carbonic acid or acetic acid, is preferable in order that the soluble magnesium compound formed thereby is readily decomposeable into magnesium oxide after application to the surface to be coated. Further, the acid selected preferably should be noncorrosive. For this reason, it has been found that carbonic acid and acetic acid produce desirable results. Treating the solution by dissolving therein carbon dioxide, gas or solid, will produce carbonic acid with any water present in the solution. The carbonic acid then reacts with magnesium hydroxide to form soluble magnesium bicarbonate. The coating solution will then contain magnesium methylate and magnesium bicarbonate dissolved in methyl alcohol. Upon heating, the alcohol is volatilized and the magnesium methylate and magnesium bicarbonate are readily decomposed to leave a residue of magnesium oxide on the coated surface.

As stated above, one preferred method of producing carbonic acid to react with the magnesium hydroxide and form magnesium bicarbonate is to add carbon dioxide, either in the gaseous or solid state, to the solution. The carbon dioxide will immediately combine with any water present to form carbonic acid, which in turn will react with magnesium hydroxide to produce magnesium bicarbonate. The magnesium hydroxide precipitate is thereby dissolved. Such reaction is spontaneous; the formation of the magnesium bicarbonate liberating water which combines with the carbon dioxide to form further carbonic acid which in turn reacts with the magnesium hydroxide. After sufficient carbon dioxide has combined with water in the solution so that no water exists for further production of magnesium hydroxide, the coating solution can be then saturated with carbon dioxide, if desired, which will further eliminate any tendency of the magnesium methylate to precipitate out as magnesium hydroxide.

Such a treated coating solution consists substantially of magnesium methylate dissolved in methyl alcohol, with relatively minute quantities of magnesium bicarbonate, depending upon the amount of water which has combined with the coating solution.

While the exact weight of magnesium in the solution is not critical, solutions containing up to 10% by weight of magnesium appear satisfactory.

A coating solution containing 5% of magnesium by weight may be prepared by reacting five parts by weight of magnesium with 95 parts by weight of methyl alcohol. The magnesium will react spontaneously with the methyl alcohol producing magnesium methylate and giving off hydrogen according to the reaction, $$2CH_3OH + Mg \rightarrow Mg(CH_3O)_2 + H_2$$

Due to the practical difficulty of maintaining an anhydrous solution, the magnesium methylate formed will react with water present to produce a precipitate of magnesium hydroxide and methyl alcohol according to the equation, $Mg(CH_3O)_2 + 2H_2O \rightarrow Mg(OH)_2 + 2CH_3OH$.

A small amount of solid carbon dioxide (Dry Ice), is dissolved in the alcoholic magnesium methylate solution to prevent the formation of a precipitate and will also cause any prior precipitate to dissolve, leaving a clear solution. Under conditions where magnesium hydroxide is present, sufficient water is also present so that the carbon dioxide will unite with the water to form carbonic acid. The magnesium hydroxide then reacts with the carbonic acid according to the reaction, $$Mg(OH)_2 + 2H_2CO_3 \rightarrow Mg(CHO_3)_2 + 2H_2O$$

The coating solution then is basically magnesium methylate dissolved in methyl alcohol with a possibility of a small quantity of magnesium bicarbonate dissolved in the solution. The amount of magnesium bicarbonate formed will, of course, depend upon the amount of moisture picked up by the anhydrous solution.

While sufficient carbon dioxide should be dissolved to unite with substantially all the water present in the solution, the exact quantity of carbon dioxide needed for stoichiometric proportion to form magnesium bicarbonate with all of the magnesium hydroxide is, of course, dependent on the amount of water present in the coating solution and on the moisture present in the surroundings of the coating solution, and therefore not subject to precise determination. It is desirable, but not necessary to saturate the solution with carbon dioxide and thereby prevent future formation of precipitate. As the solution will not supersaturate, any excess carbon dioxide will be liberated by the solution.

The coating solution when applied to a surface is readily decomposed, the methyl alcohol evaporating thereby depositing the magnesium salt on the surface being coated. If these magnesium salts are heated, they will decompose to give magnesium oxide, which forms an electrical insulating layer on, for example, steel, and the other products of the reactions escape as gases. A temperature in the range of 100° C. will volatilize the alcohol and partially decompose the magnesium salts as indicated by the first steps of each of the following reactions. A temperature in the range of 350° C. will complete the decomposition to form magnesium oxide as indicated by the reactions as follows:

$$Mg(CH_3O)_2 + 2H_2O \rightarrow 2CH_3OH + Mg(OH)_2 \quad \text{(1st step)}$$
$$Mg(OH)_2 \rightarrow H_2O + MgO \quad \text{(Completion)}$$

$$Mg(HCO_3)_2 \rightarrow H_2O + CO_2 + MgCO_3 \quad \text{(1st step)}$$
$$MgCO_3 \rightarrow CO_2 + MgO \quad \text{(Completion)}$$

The presence of excess carbon dioxide in the coating solution will not hinder these reactions because the carbon dioxide will be evolved at the same time as the alcohol diluent is volatilized. The magnesium oxide is deposited in this manner in a very thin, adherent, electrically insulating layer on the surfaces coated. There appears to be no particular advantage in heating the surface to above 350° C.

The coating solution is readily applied to the desired surface by dipping the surface in the solution; however, other methods of application may be used, it being understood that the method of applying the coating solution is well known in the art and that this invention is not limited to any particular mode of application.

This method may be used in forming an adherent film of magnesium oxide on materials such as metals, glass, and plastic. The film may be heated up to relatively high temperatures with no change of composition, and possesses high resistivity to the passage of an electric current.

According to the invention, solutions as concentrated as 10%, or more, magnesium may be readily made without precipitation while previous methods produced difficulties when the solution contained as much as 1.5% magnesium.

In accordance with the patent statutes, I have described what at present is considered to be the preferred embodiment of my invention, with a specific example thereof. However, it will be obvious to those skilled in the art that various changes and modifications may be made in the disclosed method and composition without departing from my invention, and it is, therefore, aimed in the appended claims to cover all such changes and modifications as fall within the true spirit and scope of my invention.

What I claim as new and desire to secure by Letters Patent of the United States is:

1. A method of forming an adherent film of magnesium oxide on a surface comprising the steps of reacting magnesium with a dry alcohol selected from the group consisting of methyl alcohol, ethyl alcohol and propyl alcohol to form the alcohol solution of the corresponding magnesium alkoxide, combining with said solution acetic acid which will react with magnesium hydroxide precipitate to form a soluble magnesium compound, applying said solution to said surface, heating said surface and evaporating all volatile matter thereby to provide an adherent film of magnesium oxide remaining upon said surface.

2. A method of forming an adherent film of magnesium oxide on a surface comprising the steps of reacting magnesium with methyl alcohol to form the alcohol solution of magnesium methylate, combining with said solution carbonic acid which will react with magnesium hydroxide precipitate to form a soluble magnesium bicarbonate, applying said solution to said surface, heating said surface and evaporating all volatile matter thereby to provide an adherent film of magnesium oxide remaining upon said surface.

3. A method of forming an adherent film of magnesium oxide on a surface comprising reacting magnesium with methyl alcohol to form the alcohol solution of magnesium methylate, dissolving carbon dioxide in said solution, applying said solution to said surface, heating said surface and evaporating all volatile matter thereby to provide an adherent film of magnesium oxide remaining upon said surface.

4. A method of forming an adherent film of magnesium oxide on a surface comprising reacting magnesium with methyl alcohol to form the alcohol solution of magnesium methylate, substantially saturating said solution with carbon dioxide, applying said solution to said surface, heating said surface and evaporating all volatile matter thereby to provide an adherent film of magnesium oxide remaining upon said surface.

5. A method of forming an adherent film of magnesium oxide on a surface including the steps of forming a coating solution by combining an alcoholic solution of magnesium alkoxide from the group consisting of magnesium methylate, magnesium ethylate, and magnesium propylate, substantially saturating said solution with carbon dioxide, applying said coating solution to said surface, and evaporating all volatile matter thereby to provide an adherent film of magnesium oxide remaining upon said surface.

6. A method of forming an adherent film of magnesium oxide on a surface including the steps of forming a coating solution by combining an alcohol solution of magnesium methylate with acetic acid which will react with magnesium hydroxide precipitate to form a soluble magnesium compound, applying said coating solution to said surface, and evaporating all volatile matter thereby to provide an adherent film of magnesium oxide remaining upon said surface.

7. A method of forming an adherent film of magnesium oxide on a surface including the steps of forming a coating solution by dissolving carbon dioxide in an alcohol solution of magnesium methylate, applying said coating solution to said surface, and evaporating all volatile matter thereby to provide an adherent film of magnesium oxide remaining upon said surface.

8. A method of forming an adherent film of magnesium oxide on a surface including the steps of applying to the surface a coating solution of an alcohol solution of magnesium alkoxide from the group consisting of magnesium methylate, magnesium ethylate, and magnesium propylate, and containing carbonic acid which will react with magnesium hydroxide precipitate to form magnesium bicarbonate, and evaporating all volatile matter therefrom thereby to provide an adherent film of magnesium oxide remaining upon said surface.

9. A method of forming an adherent film of magnesium oxide on a surface including the steps of applying to the surface a coating solution of an alcohol solution of magnesium methylate and containing carbonic acid which will react with magnesium hydroxide precipitate to form magnesium bicarbonate, and evaporating all volatile matter therefrom thereby to provide an adherent film of magnesium oxide remaining upon said surface.

10. A method of forming an adherent film of magnesium oxide on a surface including the steps of applying to the surface a coating solution of an alcohol solution of magnesium methylate having carbon dioxide dissolved therein, and evaporating all volatile matter thereby to provide an adherent film of magnesium oxide remaining upon said surface.

11. A method of forming an adherent film of magnesium oxide on a surface comprising the steps of reacting magnesium with a dry alcohol selected from the group consisting of methyl alcohol, ethyl alcohol and propyl alcohol to form the alcohol solution of the corresponding magnesium alkoxide, dissolving carbon dioxide in said solution, applying said solution to said surface, heating said surface and evaporating all volatile matter thereby to provide an adherent film of magnesium oxide remaining upon said surface.

References Cited in the file of this patent

UNITED STATES PATENTS

| | | |
|---|---|---|
| 1,867,362 | Lathrop | July 12, 1932 |
| 2,292,065 | Elsey | Aug. 4, 1942 |
| 2,491,033 | Byrns et al. | Dec. 13, 1949 |
| 2,572,906 | Berringer | Oct. 30, 1951 |
| 2,613,162 | Chatfield | Oct. 7, 1952 |
| 2,673,162 | Williams et al. | May 23, 1954 |